United States Patent [19]
Nickels, Jr. et al.

[11] Patent Number: 6,000,140
[45] Date of Patent: *Dec. 14, 1999

[54] POWER TOOL WITH LUBRICATING SYSTEM

[75] Inventors: Richard C. Nickels, Jr., Hampstead; Judd Staples, Baltimore, both of Md.

[73] Assignee: Black & Decker Inc., Newark, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/982,127

[22] Filed: Dec. 1, 1997

[51] Int. Cl.⁶ .................................................. B23D 45/16
[52] U.S. Cl. ........................................... 30/388; 30/123.3
[58] Field of Search .................................... 30/123.3, 388, 30/390, 391; 74/417, 467; 184/6.12, 6.15, 11.1, 13.1, 62, 63; 310/50

[56] References Cited

U.S. PATENT DOCUMENTS

| | | | |
|---|---|---|---|
| 963,520 | 7/1910 | Costello | 30/390 |
| 1,032,724 | 7/1912 | Adams | 184/12.6 |
| 1,175,963 | 3/1916 | Loeser | 30/390 |
| 1,425,152 | 8/1922 | Viers | 30/290 |
| 1,613,027 | 1/1927 | Fekete et al. | 74/467 |
| 1,732,725 | 10/1929 | Kohl et al. | 184/61 |
| 1,785,065 | 12/1930 | Aborn | 30/391 |
| 1,806,582 | 5/1931 | Beutner | 30/390 |
| 1,816,966 | 8/1931 | Gray et al. | 30/390 |
| 2,912,065 | 11/1959 | Moller . | |
| 3,123,109 | 3/1964 | Bork | 30/388 |
| 3,220,277 | 11/1965 | Dixon | 74/467 |
| 3,647,024 | 3/1972 | Wick et al. . | |
| 3,886,658 | 6/1975 | Wikoff | 30/388 |
| 4,560,056 | 12/1985 | Stockton . | |
| 4,677,871 | 7/1987 | Taniyama et al. . | |
| 5,184,967 | 2/1993 | Onoue et al. . | |
| 5,232,291 | 8/1993 | Kuan . | |

FOREIGN PATENT DOCUMENTS

| | | |
|---|---|---|
| 610254 | 9/1926 | France . |
| 1801917 | 5/1970 | Germany . |
| 807832 | 1/1959 | United Kingdom . |

*Primary Examiner*—Rinaldi I. Rada
*Assistant Examiner*—Gyounghyun Bae
*Attorney, Agent, or Firm*—Adan Ayala

[57] ABSTRACT

A power tool includes a motor having a first shaft, a transmission mechanism operatively connected to the first shaft, a second shaft operatively connected to the transmission mechanism, a housing enclosing the transmission mechanism and adapted to contain a quantity of lubricating grease, and a grease propeller rotatably disposed within the housing on at least one of the first and second shafts for circulating the grease within the housing. A blade may be operatively connected to the second shaft. The transmission mechanism includes a first gear operatively connected to the first shaft, and a second gear operatively connected to the second shaft, where the second gear operatively meshes with the first gear. It may be advantageous to dispose the first and second gears in such a manner so that distance between the blade and the second gear is larger than the distance between the blade and the first gear.

14 Claims, 3 Drawing Sheets

POWER TOOL WITH LUBRICATING SYSTEM

FIELD OF THE INVENTION

The present invention relates to power tools and, more particularly, power tools having lubricating systems for their transmission mechanisms.

BACKGROUND OF THE INVENTION

Generally, power tools have transmission mechanisms to change the speed or direction of the output shaft, etc. Most transmission mechanisms only have some grease disposed between the gears at the time of assembly. However, the grease tends to dissipate from the transmission mechanism, leaving the gears exposed to the friction forces, etc. This condition tends to cause gear binding and/or loss of operation.

It is an object of the present invention to provide a power tool with a lubricating system that avoids the prior art problems.

SUMMARY OF THE INVENTION

The present invention provides a power tool having a motor having a first shaft, a first gear operatively connected to the first shaft, a second gear operatively meshing with the first gear, a second shaft operatively connected to the second gear, a housing enclosing the first and second gears and adapted to contain a quantity of lubricating grease, and a grease propeller rotatably disposed on at least one of the first and second shafts for circulating the grease within the housing.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION OF THE PREFERRED EMBODIMENTS

Figure 1:
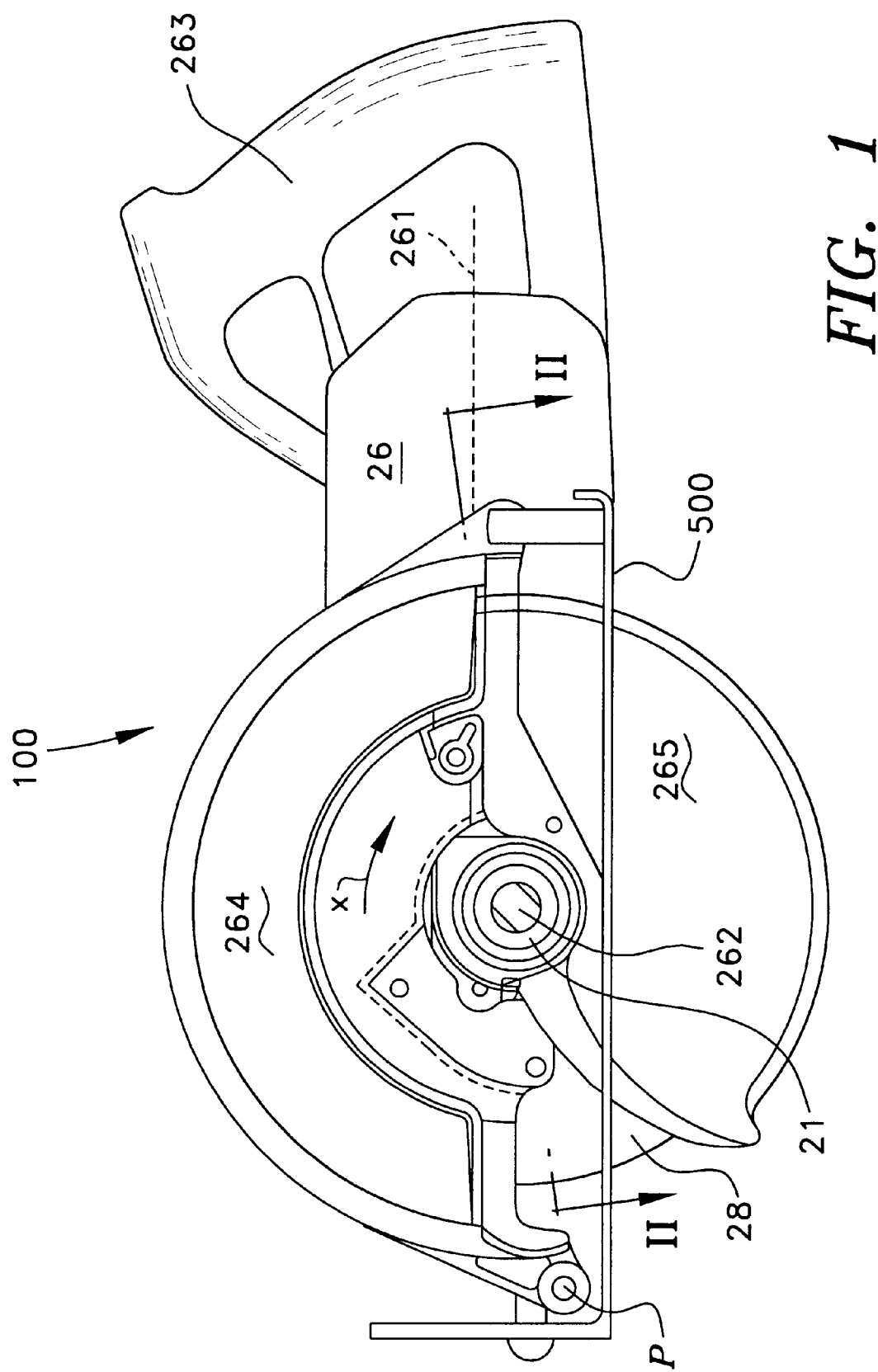
FIG. 1 is a left side elevational view of a circular saw.
Figure 2:
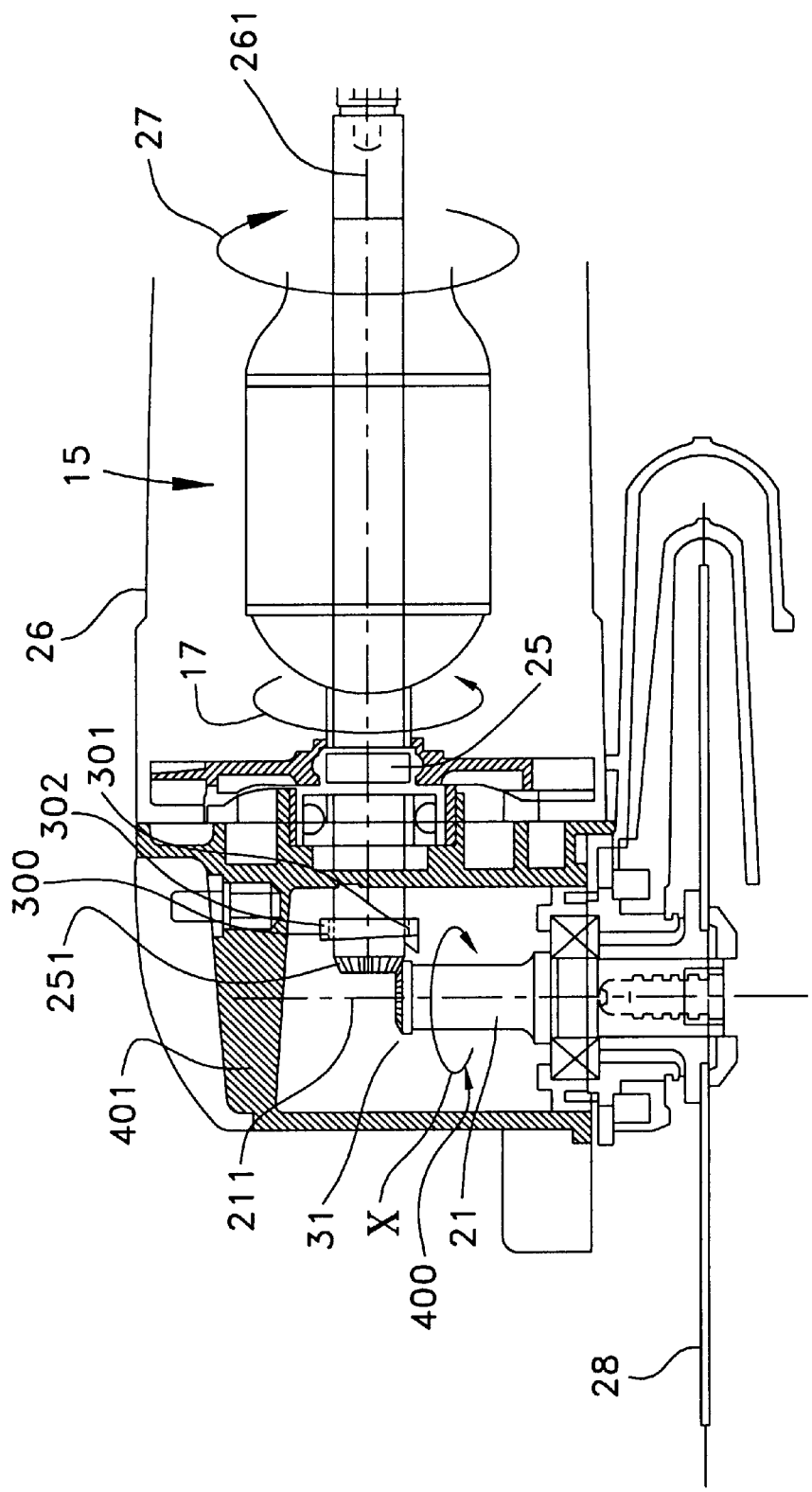
FIG. 2 is a partial cross-sectional view of the saw along line II—II of FIG. 1 illustrating a first embodiment of the present invention.

The invention is now described with reference to the accompanying figures, wherein like numerals designate like parts. Referring to FIGS. 1–2, an exemplary circular saw 100 is provided in which a preferred embodiment of the invention may be embodied is shown. Persons skilled in the art will recognize that a circular saw is portrayed herein for illustration purposes and that the present invention may be implemented in any power tool, including, but not limited to miter saws, chop saws, table saws, band saws, jigsaws, routers, scroll saws, blenders, electric knifes, electric screwdrivers, etc., having a transmission mechanism. The circular saw 100 has a motor 15, a motor housing 26 enclosing the motor 15, and an arbor shaft 21 for carrying a circular saw blade 28. The motor axis 261 is perpendicular to the axis 211 of the arbor shaft 21 and to the blade rotation axis 262. In addition, the housing 26 carries the main handle 263.

The circular saw 100 also has a shoe 500 supporting the housing 26. Preferably, the shoe 500 supports the housing 26 in such manner so that the housing 26 can be beveled relative to the shoe 500. In addition, the shoe 500 supports the housing 26 in a manner well known in the art so that the housing 26 can be pivoted about pivot P in order to change the blade's depth of cut. Persons skilled in the art will recognize that the housing inclination angle relative to the shoe will increase as the depth of cut setting is decreased.

It is also preferable to provide a fixed upper blade guard 264, attached to the housing 26, for covering the upper part of the blade 28. Preferably, a movable lower blade guard 265 for covering the lower part of the blade 28 is also provided.

FIG. 2 shows a cross-sectional view of the saw 100 with a transmission mechanism 400. The motor 15 has a drive shaft 25 connected the transmission mechanism 400, which in turn is connected to the arbor shaft 21, which drives the blade 28 in a clockwise direction X, as is necessary for cutting. The transmission mechanism 400 includes a gear 251 connected to the drive shaft 25 and a bevel gear 31, which in turn is fixed to the arbor shaft 21. Gear 251 and bevel gear 31 mesh, ultimately driving the blade 28.

A housing 401 encloses the transmission mechanism 400. The housing 401 is adapted to contain lubricating grease for lubricating the transmission mechanism 400. Accordingly, the housing 401 is preferably sealed.

Fixedly disposed on the drive shaft 25, within housing 401, is a lobed grease propeller 300. Accordingly, the grease propeller 300 rotates when the drive shaft 25 rotates, circulating the grease and forcing the grease towards the gear 251 and the bevel gear 31. Using grease propeller 300 accordingly achieves the following advantages: (1) the rotational energy of the shaft 25 is used to recirculate grease squeezed out of and thrown away from the meshed gears; (2) grease propeller 300 is lower in cost than grease pump systems; and (3) grease propeller 300 allows use of higher apparent viscosity greases, which do not require elaborate housing seals.

Preferably, the grease propeller 300 comprises a support shaft 302 and a spiral lobe 301 to convey grease axially of the support shaft 302. The support shaft 302 is preferably formed integrally with the drive shaft 25 at a position upstream of the meshed gears 251 and 31 to be lubricated. The grease propeller may have other constructions for conveying grease axially along its support shaft 302 toward the meshed hears, such as a spiral flute formed on the support shaft 302 or a plurality of fan-shaped blades supported on the support shaft 302. While it is clearly preferable to form the grease propeller 300 integrally with the drive shaft 25 for cost and compactness, the grease propeller 300 could be formed independently of the drive shaft 25.

Figure 3:
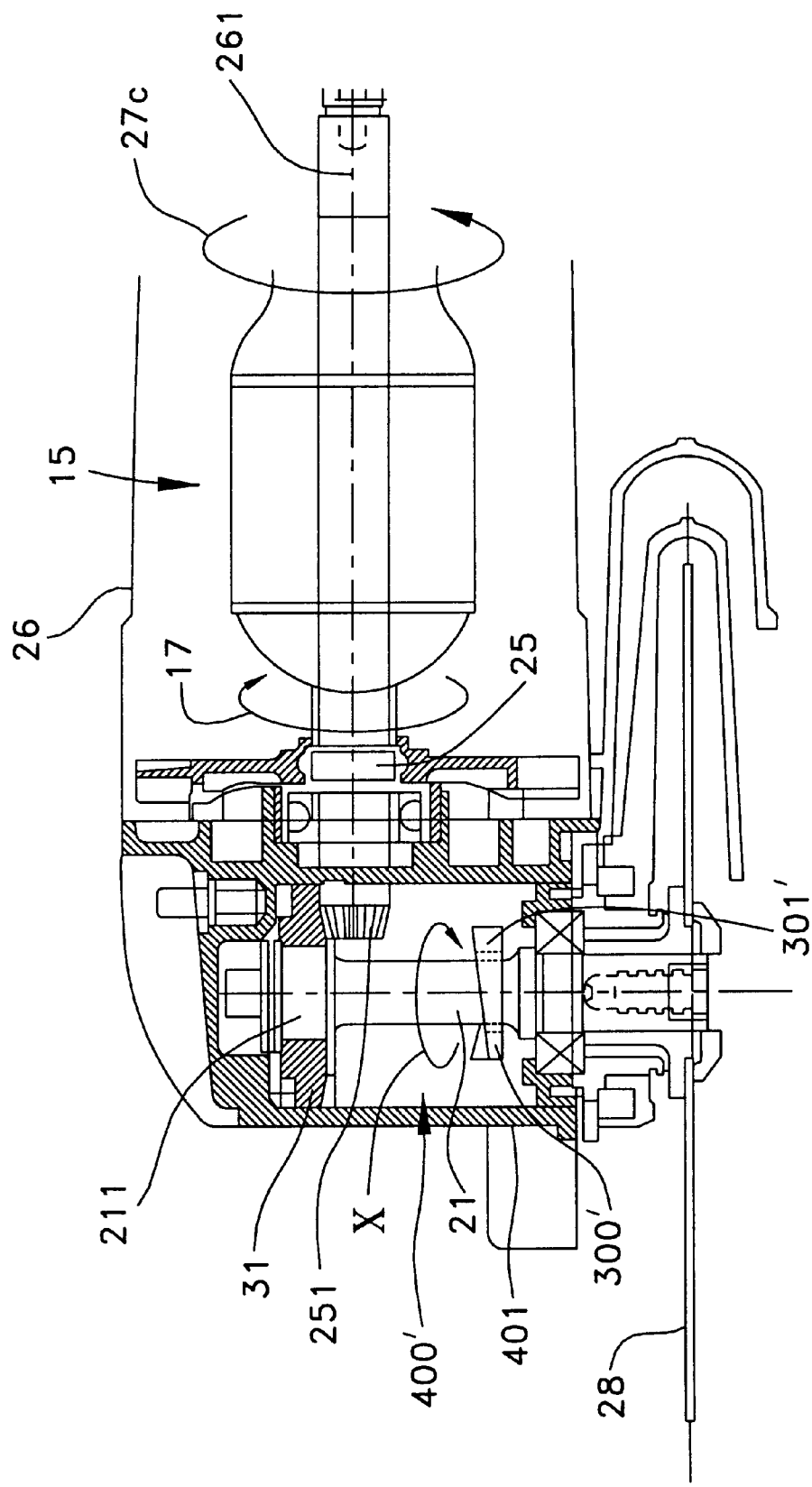
FIG. 3 is a partial cross-sectional view of the saw along line II—II of FIG. 1 illustrating a second embodiment of the present invention.

FIG. 3 shows a cross-sectional view of the saw 100 with a transmission mechanism 400'. Like in the embodiment of FIG. 2, the motor 15 has a drive shaft 25 along the motor axis 261. The drive shaft 25, in turn, is connected to a transmission mechanism 400'. The transmission mechanism 400' connects the drive shaft 25 and the arbor 21, and includes a gear 251 disposed on the drive shaft 25, and a bevel gear 31 disposed on the arbor 21.

Unlike the transmission of FIG. 2, the distance between the blade 28 and the bevel gear 31 is greater than the distance between the blade 28 and the drive shaft 25 such that the direction of the drive shaft rotation and arbor rotation are both clockwise.

Like before, a housing 401 encloses the transmission mechanism 400'. The housing 401 is adapted to contain lubricating grease for lubricating the transmission mechanism 400'. Accordingly, the housing 401 is preferably sealed.

In addition, a lobed grease propeller 300' is fixedly disposed within housing 401 on the arbor shaft 21. Accordingly, the grease propeller 300' rotates when the arbor shaft 21 rotates, circulating the grease and forcing the grease towards the gear 251 and the bevel gear 31. This arrangement also obtains the advantages described above.

Preferably, the grease propeller 300' comprises a support shaft 302' and a spiral lobe 301' to convey grease axially of the support shaft 302'. The support shaft 302' is preferably formed integrally with the arbor shaft 21 at a position upstream of the meshed gears 251 and 31 to be lubricated. The grease propeller 300' may have other constructions for conveying grease axially along its support shaft 302' toward the meshed hears, such as a spiral flute formed on the support shaft 302' or a plurality of fan-shaped blades supported on the support shaft 302'. While it is clearly preferable to form the grease propeller 300' integrally with the arbor shaft 21 for cost and compactness, the grease propeller 300' could be formed independently of the arbor shaft 25'.

Persons skilled in the art may recognize other features that can be added to the embodiments described above, such as adding other structures to the grease propeller 300, or providing grease propellers on both drive shaft 25 and arbor shaft 21. Similarly, persons skilled in the art may recognize other alternatives to the means disclosed herein. However, all these additions and/or alterations are considered to be within the scope of the claims underneath.

We claim:

1. A power tool comprising:
   a motor having a first shaft;
   a first gear operatively connected to the first shaft;
   a second gear operatively meshing with the first gear;
   a second shaft operatively connected to the second gear;
   a housing enclosing the first and second gears and adapted to contain a quantity of lubricating grease; and
   a grease propeller rotatably disposed within the housing on at least one of the first and second shafts for circulating the grease within the housing, wherein the grease propeller is formed on the at least one of the first and second shafts and comprises means for conveying grease toward the meshed first and second gears.

2. The power tool of claim 1, wherein the power tool is a circular saw.

3. The power tool of claim 1, wherein a blade is operatively connected to the second shaft.

4. The power tool of claim 3, wherein distance between the blade and the second gear is larger than distance between the blade and the first gear.

5. The power tool of claim 1, wherein the grease propeller comprises a spiral lobe surrounding the at least one of the first and second shafts to convey grease toward the meshed first and second gears.

6. The power tool of claim 1, wherein said conveying means comprises a lobe disposed on the grease propeller.

7. A power tool comprising:
   a motor having a first shaft;
   a transmission mechanism operatively connected to the first shaft, said
   transmission mechanism comprising first and second gears meshing together;
   a second shaft operatively connected to the transmission mechanism;
   a housing enclosing the transmission mechanism and adapted to contain a quantity of lubricating grease; and
   a grease propeller rotatably disposed within the housing on at least one of the first and second shafts for circulating the grease within the housing, wherein the grease propeller is formed on the at least one of the first and second shafts and comprises means for conveying grease toward the meshed first and second gears.

8. The power tool of claim 7, wherein the power tool is a circular saw.

9. The power tool of claim 7, wherein a blade is operatively connected to the second shaft.

10. The power tool of claim 9, wherein the transmission mechanism comprises
    a first gear operatively connected to the first shaft; and
    a second gear operatively connected to the second shaft, the second gear operatively meshing with the first gear.

11. The power tool of claim 10, wherein distance between the blade and the second gear is larger than distance between the blade and the first gear.

12. The power tool of claim 10, wherein the grease propeller is formed on the at least one of the first and second shafts upstream from the meshed first and second gears to convey grease toward the meshed first and second gears.

13. The power tool of claim 7, wherein the first gear is operatively connected to the first shaft; and a second gear is operatively connected to the second shaft.

14. The power tool of claim 7, wherein said conveying means comprises a lobe disposed on the grease propeller.

* * * * *